United States Patent [19]

Ukita et al.

[11] Patent Number: 5,434,474
[45] Date of Patent: Jul. 18, 1995

[54] LIGHTING APPARATUS FOR DISCHARGE LAMP

[75] Inventors: Nobuo Ukita; Kenji Nakamura; Takashi Osawa; Yasumasa Hanazaki, all of Hyogo, Japan

[73] Assignee: Mitsubishi Denki Kabushiki Kaisha, Tokyo, Japan

[21] Appl. No.: 226,316

[22] Filed: Apr. 12, 1994

[30] Foreign Application Priority Data

Apr. 12, 1993 [JP] Japan .................... 5-109959

[51] Int. Cl.⁶ .............................. H05B 37/00
[52] U.S. Cl. .................... 315/128; 315/127; 315/308; 315/DIG. 7
[58] Field of Search ............ 315/291, 106, 107, 127, 315/128, 227 R, 209 R, 308, DIG. 7

[56] References Cited

U.S. PATENT DOCUMENTS

| | | | |
|---|---|---|---|
| 4,042,856 | 8/1977 | Steigerwald | 315/227 R |
| 5,068,570 | 11/1991 | Oda et al. | 315/128 |
| 5,151,631 | 9/1992 | Oda et al. | 315/127 |
| 5,170,099 | 12/1992 | Ueoka et al. | 315/291 |

Primary Examiner—Robert J. Pascal
Assistant Examiner—Haissa Philogene
Attorney, Agent, or Firm—Sughrue, Mion, Zinn, Macpeak & Seas; Richard C. Turner

[57] ABSTRACT

An apparatus for lighting a discharge lamp is provided with an inverter circuit 3 for causing an input power supply 2 to generate the voltage required for a discharge lamp 1, a rectifying smoothing circuit 4 for rectifying and smoothing the output of the invertor circuit 3, a feedback control circuit 8 for computing the power required for the discharge lamp 1 so as to control the feedback control circuit 8 in the feedback mode, a polarity switching circuit 9 for switching the polarity of the rectified and smoothed output to apply the output to the discharge lamp 1 with a low-frequency square wave, and an ignitor 11 for superposing a high-voltage pulse on the discharge lamp 1 when the discharge lamp 1 is started. The apparatus therefor further includes an overcurrent control circuit 14 for detecting an overcurrent flowing into the discharge lamp 1 so as to make the polarity switching circuit 9 perform a high-frequency chopper operation together with a low-frequency operation for only an interval during which the overcurrent flows, so that the life of the discharge lamp is prolonged by suppressing the overcurrent flowing into the discharge lamp and preventing its electrodes from wearing.

8 Claims, 7 Drawing Sheets

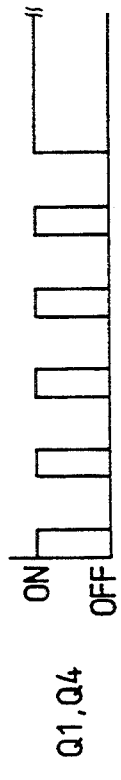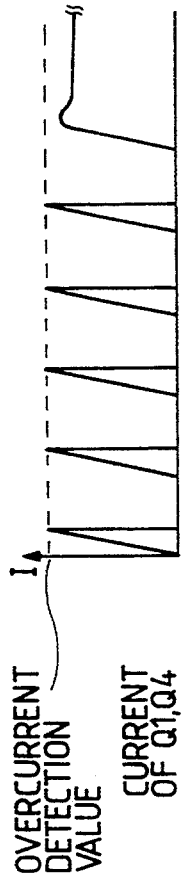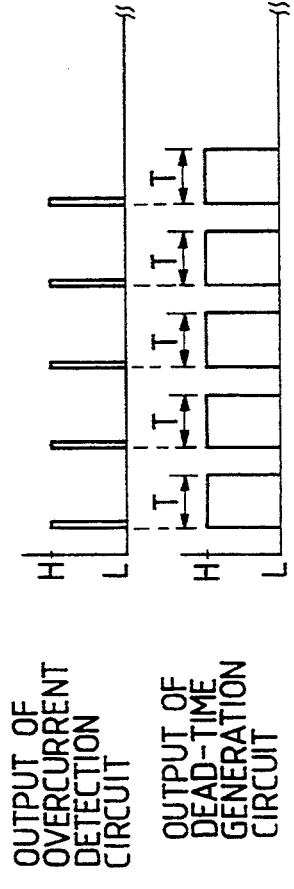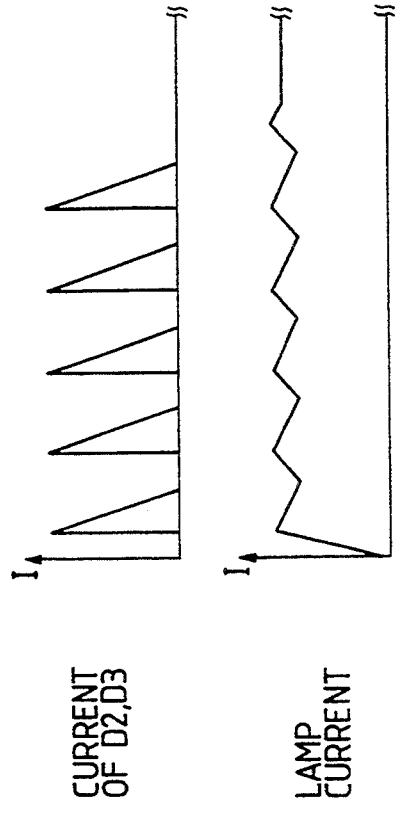
FIG. 2A  Q1,Q4
FIG. 2B  OVERCURRENT DETECTION VALUE / CURRENT OF Q1,Q4
FIG. 2C  OUTPUT OF OVERCURRENT DETECTION CIRCUIT
FIG. 2D  OUTPUT OF DEAD-TIME GENERATION CIRCUIT
FIG. 2E  CURRENT OF D2,D3
FIG. 2F  LAMP CURRENT

LIGHTING APPARATUS FOR DISCHARGE LAMP

BACKGROUND OF THE INVENTION

The present invention relates to an apparatus for lighting a discharge lamp in such a way as to prolong the life of the discharge lamp by adding a high-frequency operation as occasion arises to the low-frequency operation of a polarity switching circuit for use in supplying power to the discharge lamp, normally with a low-frequency AC square wave, to suppress an overcurrent flowing into the discharge lamp and to prevent the electrodes from abrasion when the discharge lamp such as a high pressure sodium lamp, a metallic halide lamp, a high pressure mercury lamp or the like is started.

An apparatus of the sort arranged as shown in FIG. 8 has heretofore been in use for lighting a discharge lamp such as a high pressure sodium lamp, a metallic halide lamp, a high pressure mercury lamp or the like.

In FIG. 8, numeral 1 denotes a discharge lamp; 2, a input power supply; and 3, an inverter circuit for boosting the source voltage of the input power supply 2 up to a voltage what is required for the discharge lamp 1. Further, numeral 4 denotes a rectifying smoothing circuit for rectifying and smoothing the output of the invertor circuit 3, which includes a rectifier diode D and a smoothing capacitor C.

Further, numeral 5 denotes a lamp current detection resistor for detecting a lamp current flowing into the discharge lamp 1; 6, 7 lamp voltage detection resistors for detecting a lamp voltage to be applied to the discharge lamp 1; 8, a feedback control circuit for computing the power required for the discharge lamp 1 according to the lamp current detected by the resistor 5 and the lamp voltage detected by the resistors 6, 7 to cause the power thus required to be output by controlling the invertor circuit 3 in the feedback mode.

Further, numeral 9 denotes a polarity switching circuit for supplying power with a low-frequency AC square wave to stabilize the discharge arc while preventing the acoustic resonant phenomenon of the discharge lamp 1 and to prevent the cataphoretic phenomenon thereof resulting in color separation in the light emitting portion.

The polarity switching circuit 9 is formed into a full bridge type having four switching elements Q1, Q2, Q3, Q4 and four parasitic diodes D1, D2, D3, D4 connected to the respective switching elements Q1, Q2, Q3, Q4. The pairs of switching elements Q1, Q4 and Q2, Q3 are driven by a low-frequency drive circuit 10 in such a manner that they are alternately turned on and off, whereby the polarity applied to the discharge lamp 1 is inverted.

Further, numeral 11 denotes an ignitor for starting the discharge lamp 1 by superposing a high-voltage pulse thereon, the ignitor including a pulse transformer 12 and a trigger circuit 13.

When the discharge lamp 1 is started, the inverter circuit 3 boosts the source voltage of the input power supply 2 up to a voltage that is required to start the discharge lamp 1, thus causing the prescribed voltage (e.g., about 320 V) to be generated. The rectifying smoothing circuit 4 rectifies And smoothes the output of the invertor circuit 3 and then applies to the discharge lamp 1 the resulting output via the polarity switching circuit 9 and the ignitor 11.

The pair of switching elements Q1, Q4 or Q2, Q3 of the polarity switching circuit 9 is turned on, so that the starting voltage is applied to the discharge lamp 1. At this time, the lamp impedance $Z1a$ of the discharge lamp 1 is approximately infinity ($Z1a \cong \infty$).

When the ignitor 11 superposes the high-voltage pulse on the starting voltage and applies the resulting voltage to the discharge lamp 1, breakdown occurs in the discharge lamp 1, thus causing an arc discharge through a glow discharge therein. Since the vapor pressure in the light emitting tube of the discharge lamp 1 is low at this time, the lamp impedance $Z1a$ rapidly drops down. The charge stored in the smoothing capacitor C is rapidly discharged as the lamp impedance $Z1a$ sharply changes and the lamp current flows into the discharge lamp 1 in the form of an overcurrent as shown by a dotted line of FIG. 4.

At this time, the feedback control circuit 8 detects the excessive current and steeply decreases the output of the inverter circuit 3 so as to suppress the overcurrent flowing into the discharge lamp 1. However, the charge stored in the smoothing capacitor C ultimately flows through the polarity switching circuit 9, the ignitor 11 and the discharge lamp 1 as an instantaneous overcurrent, irrespective of the output of the inverter circuit 3 because the discharge route exists only on the side of the discharge lamp 1.

For this reason, sputtering has been induced in the electrodes of the discharge lamp 1, which causes the electrodes to abrade. Moreover, broken particle of the electrodes due to the sputtering stick to the inner wall of the light emitting tube of the discharge lamp 1, thus badly affecting the life of the discharge lamp 1. In other words, the electrodes abrasion as time elapses and the electrode-to-electrode distance increases as shown in FIG. 5. The drawback among others is that the life of the discharge lamp 1 is shortened.

FIG. 5 shows electrode-to-electrode distance curves when a 35W metallic halide lamp used as the discharge lamp 1 is continuously repeatedly held "on" for 5 minutes and "off" for 10 seconds in cycles.

SUMMARY OF THE INVENTION

In view of the foregoing problems, an object of the present invention is to provide such an apparatus for lighting a discharge lamp as is intended to prolong the life of the discharge lamp by suppressing an overcurrent flowing into the discharge lamp to prevent its electrodes from abrading.

An apparatus for lighting a discharge lamp according to the present invention comprises an inverter circuit for causing an input power supply to generate the voltage required for a discharge lamp, a rectifying smoothing circuit for rectifying and smoothing the output of the inverter circuit, a feedback control circuit for computing the power required for the discharge lamp to control the feedback control circuit in the feedback mode, a polarity switching circuit for switching the polarity of the rectified and smoothed output to apply the output to the discharge lamp with a low-frequency square wave, and an ignitor for superposing a high-voltage pulse on the discharge lamp when the discharge lamp is started, the apparatus further comprises an overcurrent control circuit for detecting an overcurrent flowing into the discharge lamp so as to make the polarity switching circuit perform a high-frequency chopper operation together with a low-frequency operation for only an interval during which the overcurrent flows.

Furthermore, according to the present invention, the overcurrent control circuit includes a dead-time generating circuit for holding "off" all the switching elements of the polarity switching circuit for a predetermined period of time while the overcurrent is set under control of the overcurrent control circuit.

Moreover, according to the present invention, the lightning apparatus further includes a capacitor which, together with the discharge lamp and the ignitor, forms a closed circuit and a current-limiting inductance element connected to the polarity switching circuit and the ignitor in series outside the closed circuit.

Still further, according to the present invention, the lightning apparatus further includes an overcurrent control suspending circuit for turning off all the switching elements of the polarity switching circuit when the overcurrent control operation of the overcurrent control circuit continues for a predetermined period of time.

According to the present invention, the overcurrent control circuit detects the overcurrent when the current flowing into the discharge lamp becomes what is uncontrollable by the feedback control circuit and makes the polarity switching circuit performs the high-frequency chopper operation in addition to the normal low-frequency operation. The electrodes of the discharge lamp are prevented from abrading as the overcurrent flowing into the discharge lamp can be limited. It is therefore possible to prolong the life of a discharge lamp.

Further, while the overcurrent control circuit controls the overcurrent, the dead-time generating circuit holds "off" all the switching elements of the polarity switching circuit for a predetermined interval of time, thus sharply dropping the chopper operation frequency when the overcurrent is set under control. Consequently, the stress applied to the switching elements is greatly reduced.

Furthermore, the high-voltage pulse from the ignitor is caused to flow into the discharge lamp via the closed circuit formed with the discharge lamp and the capacitor. Although an inrush current tends to flow into the capacitor when the switching elements of the polarity switching circuit are turned on and off, the inrush current is stopped by the current-limiting inductance element, whereby each of the switching elements is prevented from being damaged.

Furthermore, the overcurrent control stop circuit turns off all the switching elements of the polarity switching circuit when the overcurrent control operation of the overcurrent control circuit continues for a predetermined interval of time. Consequently, the switching elements of the polarity switching circuit will not be damaged even if they continues to perform the high-frequency operation for hours.

BRIEF DESCRIPTION OF THE DRAWINGS

FIGS. 2A to 2F are signal waveform charts in each part with reference to the first embodiment of the present invention.

DESCRIPTION OF THE PREFERRED EMBODIMENT

Referring to the accompanying drawings, an embodiment of the present invention will subsequently be described.

Figure 1:
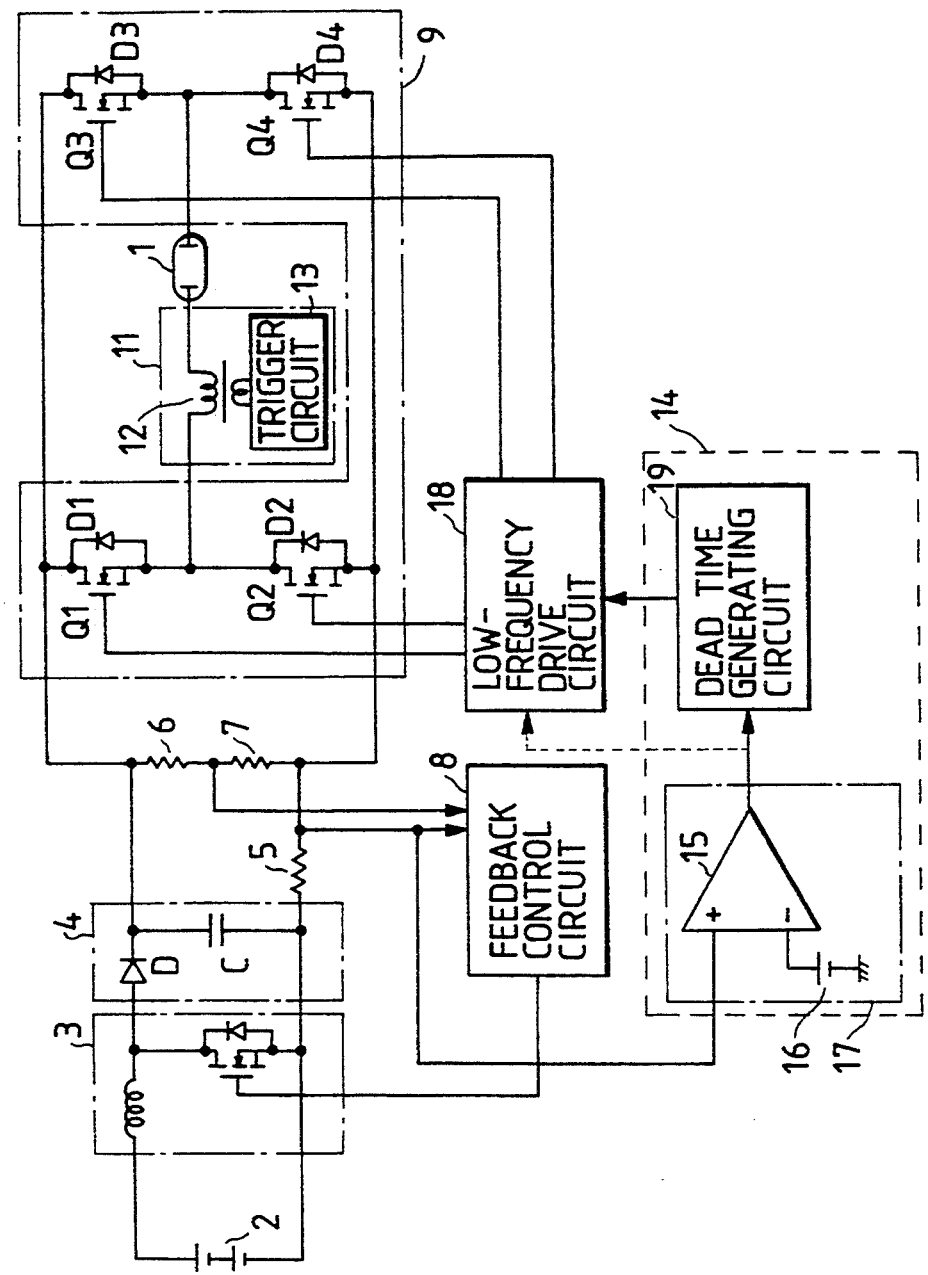
FIG. 1 is a circuit diagram illustrating a first embodiment of the present invention.

FIG. 1 shows the first embodiment of the present invention, wherein there is provided an overcurrent control circuit 14 for detecting an overcurrent arising when current flowing into a discharge lamp 1 becomes uncontrollable by a feedback control circuit 8, and for making a polarity switching circuit 9 perform a high-frequency chopper operation together with the normal low-frequency operation for only a period during which the overcurrent flows into the discharge lamp 1, whereby the current flowing into the discharge lamp 1 is made controllable.

The overcurrent control circuit 14 comprises an overcurrent detection circuit 17 for detecting an overcurrent flowing into the discharge lamp 1 by converting current flowing through a resistor 5 into voltage to compare the voltage with a reference voltage from a reference power supply 16 by means of a comparator 15, and a dead-time generating circuit 19 for sending a high-frequency dead time signal to a low-frequency drive circuit 18 for a fixed period of time T after the overcurrent is detected by the overcurrent detection circuit 17.

The low-frequency drive circuit 18 functions as what drives switching elements Q1, Q2, Q3, Q4 of the polarity switching circuit 9 at low frequency and, on receiving the dead time signal from the dead-time generating circuit 19 for the fixed period of time T during the low-frequency drive operation, suspends all the switching elements Q1~Q4 of the polarity switching circuit 9 for only the fixed period of time T by turning them off.

An overcurrent detection point of the overcurrent detection circuit 17 is set at not lower than the maximum current value set in a feedback control circuit 8, and when the current flowing into the discharge lamp 1 becomes an overcurrent uncontrollable by the feedback control circuit 8, the overcurrent detection circuit 17 detects the overcurrent. There are cases where the overcurrent flows into the discharge lamp 1:

More specifically, there is a case where the charge stored in a smoothing capacitor C at the time the discharge lamp 1 is started passes through the discharge lamp 1 and becomes an inrush current rapidly flowing therethrough, a case where when a chopper step-up converter as illustrated is employed in an inverter circuit 3, the output voltage of the inverter circuit 3 becomes lower than the source voltage of an input power supply 2 to the extent that it has entered a region in which it becomes uncontrollable and so forth.

The operation of the apparatus thus arranged will subsequently be described.

First, consideration is given to the restriction of the inrush current at the time the discharge lamp 1 is started. When the discharge lamp 1 is started, the inverter circuit 3 steps up the source voltage of the input power supply 2 up to a starting voltage necessary for starting the discharge lamp 1, so that the starting voltage (e.g., 320 V) is generated. The output of the inverter circuit 3 is rectified by a diode D before being stored as an electric charge in the smoothing capacitor C.

Then one of the pairs of switching elements Q1, Q4 and Q2, Q3 of the polarity switching circuit 9 is turned on, whereas the other pair is turned off, whereby the starting voltage is applied to the discharge lamp 1. In this case, it is assumed that the switching elements Q1, Q4 are held "on", whereas the switching elements Q2, Q3 are held "off".

Subsequently, an ignitor 11 operates to superimpose a high-voltage pulse on the starting voltage and when the resulting voltage is applied to the discharge lamp 1, dielectric breakdown occurs in the discharge lamp 1. Then an arc discharge follows via the glow discharge.

Since the vapor pressure in the arc tube of the discharge lamp 1 is low at this time, the lamp impedance Z1a sharply drops down, and the charge stored in the smoothing capacitor C quickly discharges itself in response to the lamp impedance Z1a steeply changes and then starts flowing into the discharge lamp 1.

While controlling the inverter circuit 3 so as to maintain the lamp current against the prescribed internally-calculated maximum current value (e.g., 2.6 A), the feedback control circuit 8 will operate to hold down the lamp current by even stopping the oscillating operation of the inverter circuit 3 if the lamp current exceeds the prescribed maximum current value.

However, the charge that has already been stored in the smoothing capacitor C has a discharge route only on the side of the discharge lamp 1 and consequently an overcurrent corresponding to the low lamp impedance Z1a flows into the discharge lamp 1. Therefore, the overcurrent becomes uncontrollable by the feedback control circuit 8.

On the other hand, the resistor 5 regularly detects the lamp current flowing into the discharge lamp 1 and by converting the current into voltage, enables the comparator 15 in the overcurrent detection circuit 17 to compare the lamp voltage with the reference voltage of the reference power supply 16. If the lamp current exceeds the reference voltage, the comparator 15 outputs a High-level signal and whereas outputs an Low-level signal when it remains at not higher than the reference voltage. The overcurrent detection point of the overcurrent detection circuit 17 is set at not lower than an overcurrent (2.6 A), which is uncontrollable by the feedback control circuit 8.

In consequence, the overcurrent detection circuit 17 outputs the H signal when the overcurrent that is uncontrollable by the feedback control circuit 8 flows, and outputs the L signal when the current controllable by the feedback control circuit 8 flows.

When the overcurrent detection circuit 17 outputs the H signal, the dead-time generating circuit 19 outputs the H signal for T seconds after the rise of the former H signal and the low-frequency drive circuit 18 holds "off" the switching elements Q1, Q4 for at least T seconds.

When the lamp current becomes an overcurrent that is uncontrollable by the feedback control circuit 8, the overcurrent control circuit 14 operates to control the overcurrent as shown in FIG. 2. In other words, if the lamp current becomes an overcurrent, the overcurrent detection circuit 17 detects the latter and sends the H signal to the dead-time generating circuit 19 as shown in FIG. 2C, whereby the dead-time generating circuit 19 generates the dead time signal in the low-frequency drive circuit 18 for at least T seconds after the detection of the overcurrent as shown in FIG. 2D.

Then the stop function of the low-frequency drive circuit 18 acts to hold "off" the switching elements Q1, Q4 for at least T seconds in the polarity switching circuit 9 held "on" until then, using original low-frequency driving as shown in FIG. 2A. For this reason, the current flowing from the smoothing capacitor C via the switching elements Q1, Q4 of the polarity switching circuit 9 into the discharge lamp 1 is cut at the overcurrent detection point of the overcurrent detection circuit 17 and stopped from flowing as shown in FIG. 2B. Therefore, the dead time T is provided during which all the switching elements Q1~Q4 of the polarity switching circuit 9 are held "off" for a predetermined interval of time after the overcurrent detection point.

However, the secondary winding of the ignitor 11 inserted in the discharge lamp 1 in series has a great inductance value and the current flowing until then is stored in the secondary winding of the ignitor 11 as an energy of $P = \frac{1}{2}LI^2$. This energy is, as shown in FIG. 2E, released from the ignitor 11 via the discharge lamp 1, the parasitic diode D3 of the switch element Q3, the smoothing capacitor C and the lamp current detection resistor 5 to the parasitic diode D2 of the switch element Q2 during the dead time T where all the switching elements Q1~Q4 of the polarity switching circuit 9 are held "off".

On the termination of the dead time T, the switching elements Q1, Q4 of the polarity switching circuit 9 are turned on again since the low-frequency drive circuit 18 is driven at low frequency as initially intended and the current flows from the smoothing capacitor C into the discharge lamp 1 via the switching elements Q1, Q4 of the polarity switching circuit 9. On condition that the current is still an overcurrent again, the aforesaid overcurrent control operation is repeated again.

Figure 3:
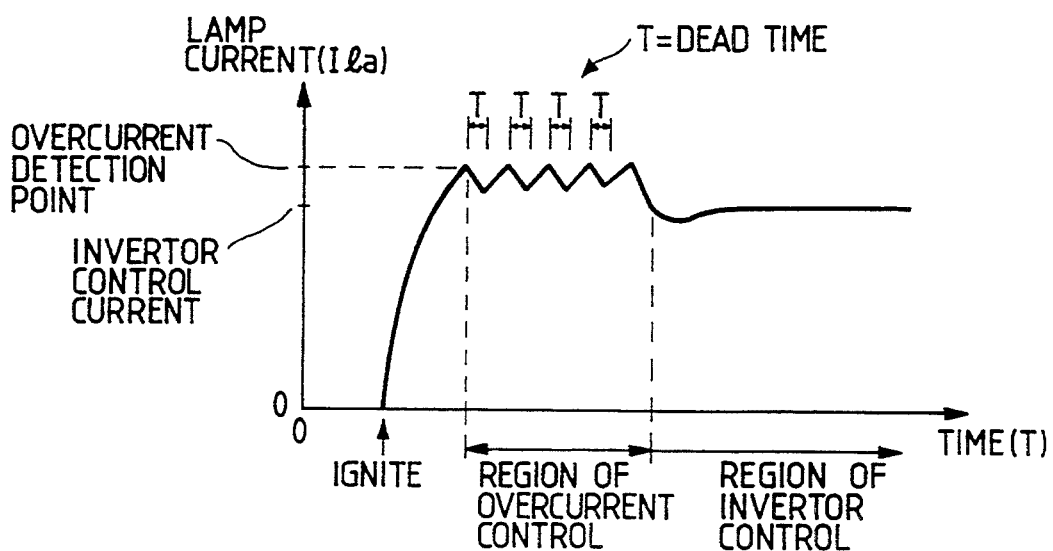
FIG. 3 is a current waveform chart immediately after a lamp is started with reference to the embodiment of the present invention.

As shown in FIG. 2F and FIG. 3, the lamp current flowing into the discharge lamp 1 is so controlled that it is set at a current value not greater than the overcurrent detection point. The aforesaid operation is repeated until the factor resulting in the overcurrent, for example, the charge stored in the smoothing capacitor C is discharged to be equated with the lamp impedance Z1a or otherwise until a short across the discharge lamp 1 is eliminated.

When the output of the overcurrent detection circuit 17 is directly input to the low-frequency drive circuit 18 without the dead-time generating circuit 19 for turning off all the switching elements Q1~Q4 for a predetermined period f time (as shown by the dotted line in FIG. 1), the chopper operation frequency at the time the overcurrent is set under control becomes extremely high.

This is due to the fact that the switching elements Q1~Q4 of the polarity switching circuit 9 are repeatedly turned on and off in an extremely narrow range with respect to the overcurrent detection point; namely, these switching elements Q1~Q4 are turned off when the overcurrent detection circuit 17 operates to indicate a value greater than the overcurrent detection point with respect to the current flowing into the discharge lamp 1, whereas they are turned on in the opposite case.

Figure 4:
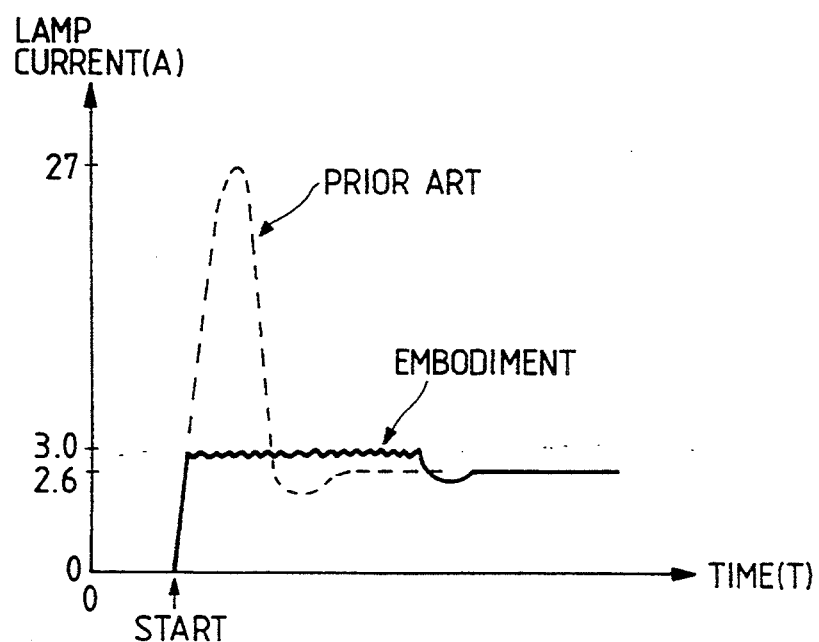
FIG. 4 is a current waveform chart immediately after a lamp is started with reference to a prior art example and the embodiment of the present invention.
Figure 5:
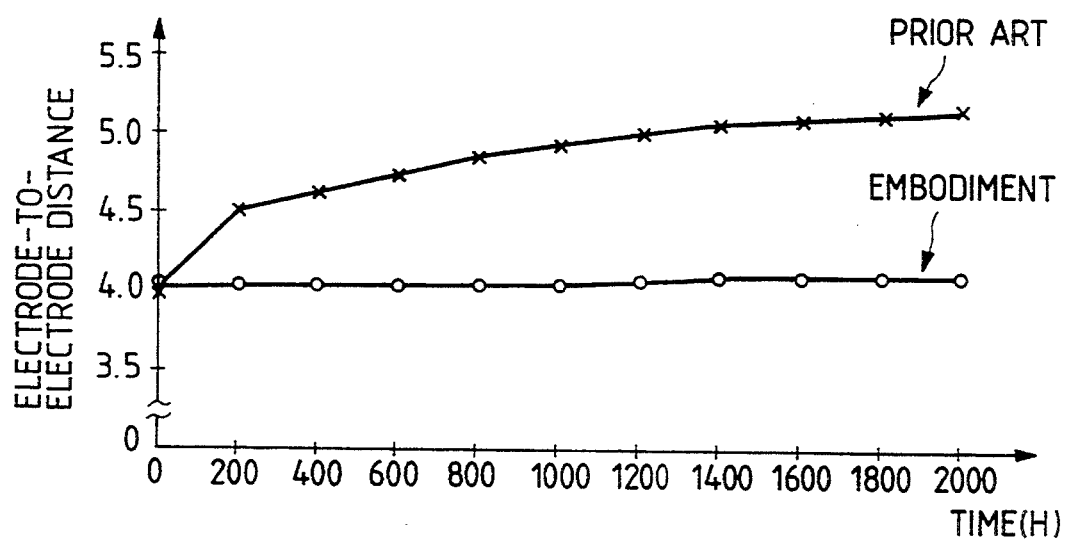
FIG. 5 is a diagram showing electrode-to-electrode distances when the prior art lamp and what embodies the present invention are repeatedly turned on and off.

By performing a series of operations in a region where the feedback control circuit 8 becomes uncontrollable and by adding the performance of the high-frequency chopper operation to the low-frequency operation in which the polarity switching circuit 9 normally performs, the discharge lamp 1 is allowed to function as what restricts the lamp current flowing therein as shown in FIG. 4. The electrodes of the discharge lamp 1 are prevented from wearing since no excessive current is allowed to flow therethrough; that is, the electrode-to-electrode distances are substantially stably curved as shown in FIG. 5 in comparison with the case of the related art. In other words, the life of such a discharge lamp 1 can be prolonged.

Although a description has been given of an embodiment of the present invention wherein the switching elements Q1, Q4 of the polarity switching circuit 9 remain in the "on" state, whereas the switching elements Q2, Q3 thereof are in the "off" state, the same will be applied to a case where the bridge operation is opposite; that is, the switching elements Q1, Q4 remain in the "off" state, whereas the switching elements Q2, Q3 remain in the "on" state.

Figure 6:
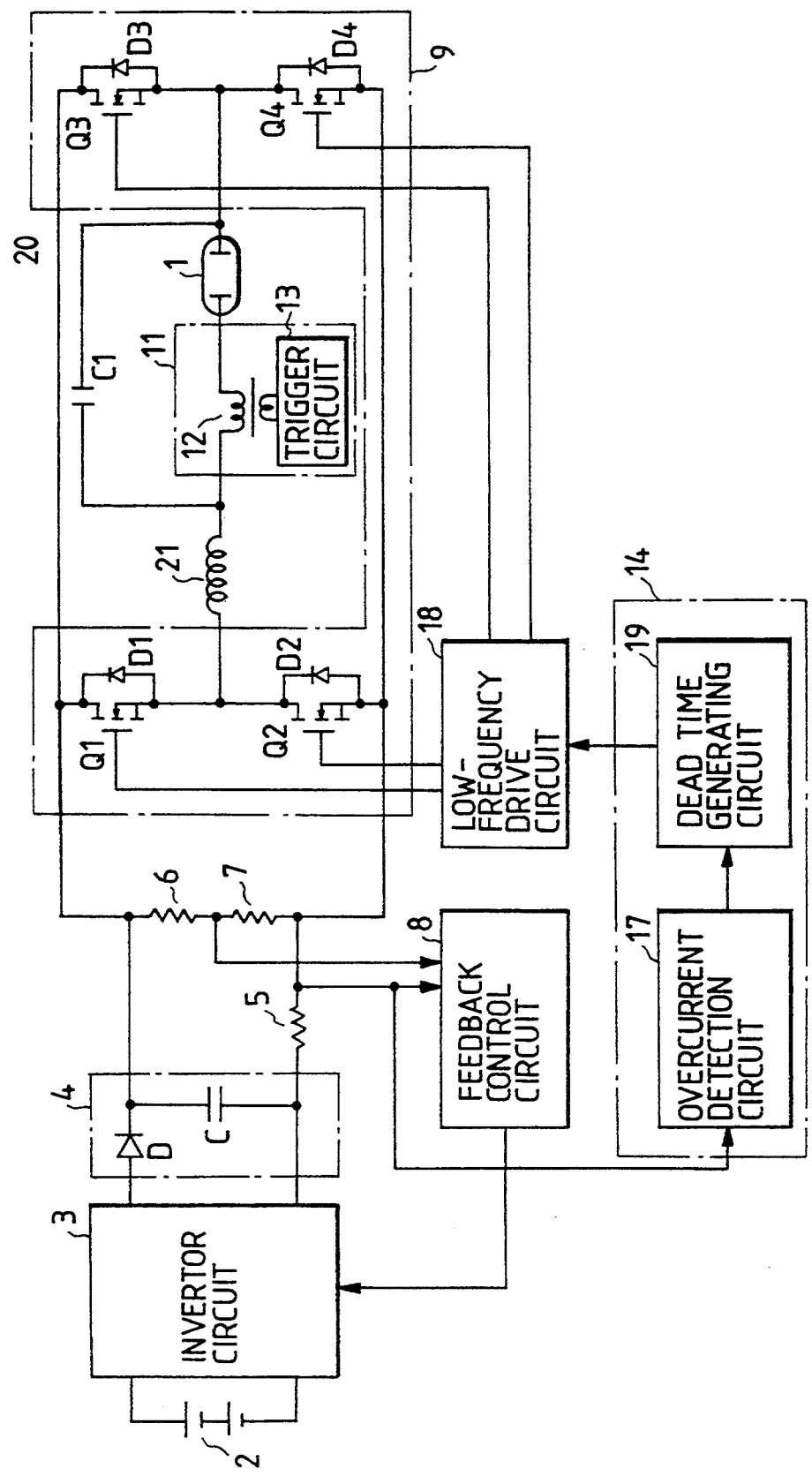
FIG. 6 is a circuit diagram illustrating a second embodiment of the present invention.

FIG. 6 illustrates second embodiment of the present invention, wherein a capacitor C1 which, together with the discharge lamp 1 and the ignitor 11, forms a closed circuit 20, whereas a current-control inductance element 21 is connected to the polarity switching circuit 9 and the ignitor 11 in series outside the closed circuit 20.

According to this arrangement, the high-voltage pulse generated by the ignitor 11 is caused to flow through the closed circuit 20 with the discharge lamp 1 and the capacitor C1. The pulse is then superposed on the starting voltage and the resulting voltage is applied to the discharge lamp 1.

Notwithstanding, the provision of only the capacitor C1 allows an inrush current to flow into the capacitor C1 when the switching elements Q1, Q4 and Q2, Q3 of the polarity switching circuit 9 are turned on and off, which causes the stress generated in the switching elements Q1~Q4 to damage them. Therefore, the inductance element 21 is used to limit the inrush current, that is, no large current is allowed to flow through the switching elements Q1, Q4 and Q2, Q3 and prevented from being damaged.

Incidentally, the inductance element 21 may be connected between the discharge lamp 1 and the switching elements Q2, Q3 or otherwise connected to both.

Figure 7:
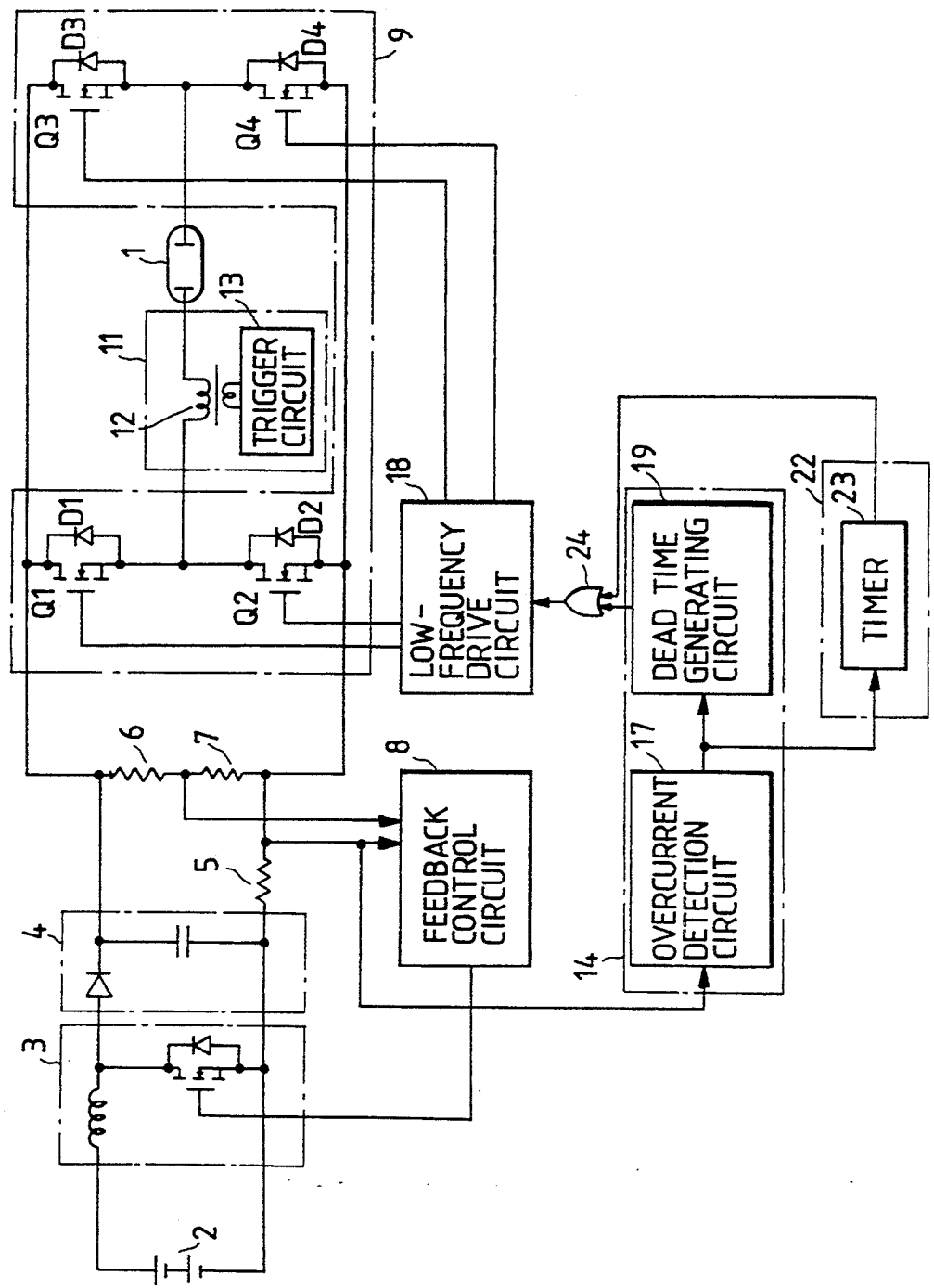
FIG. 7 is a circuit diagram illustrating a third embodiment of the present invention.
Figure 8:
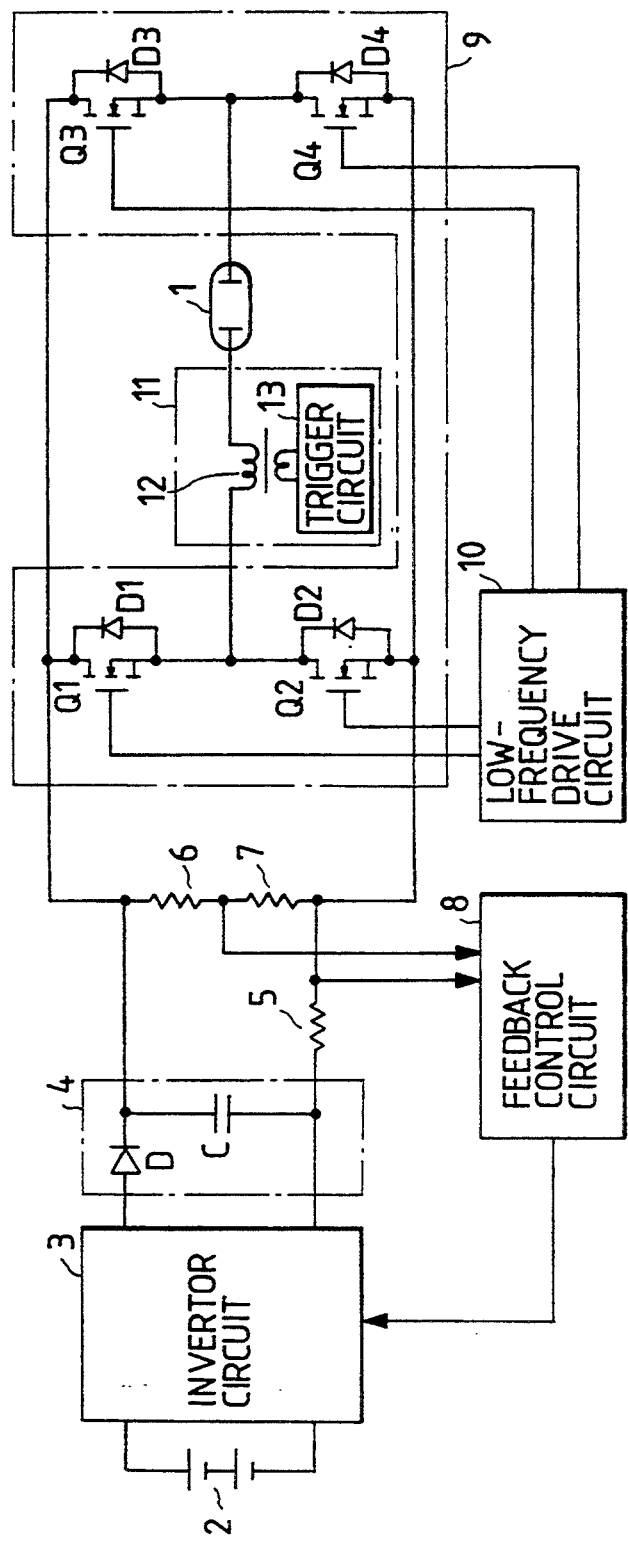
FIG. 8 is a circuit diagram illustrating the prior art example.

FIG. 7 illustrates third embodiment of the present invention, wherein there is provided an overcurrent control suspend circuit 22 for turning off all the switching elements Q1~Q4 of the polarity switching circuit 9 when the overcurrent control operation of the overcurrent control circuit 14 continues for a predetermined interval of time.

The overcurrent control suspend circuit 22 includes a timer which starts operating at the overcurrent detection point of the overcurrent detection circuit 17. Further, the output of the timer 23, together with the dead-time generating circuit 19, is connected via an OR circuit 24 to the low-frequency drive circuit 18. When set time in the timer 23 has elapsed, the low-frequency drive circuit 18 is forced to stop operating, irrespective of the operation of the overcurrent control circuit 14.

According to this arrangement, each of the switching elements Q1~Q4 of the polarity switching circuit 9 can be prevented from being damaged. In other words, since the switching elements Q1~Q4 of the polarity switching circuit 9 are originally designed for use at low frequency, they may be damaged if turned on and off at high frequency for long time under control of the overcurrent control circuit 14 as their temperature rises to increase switching loss.

If, therefore, the operation of the overcurrent control circuit 14 continues for the predetermined period of time set in the timer 23, the timer 23 will send out a timer signal to the low-frequency drive circuit 18 to force all the switching elements Q1~Q4 of the polarity switching circuit 9 to be turned off. The switching elements Q1~Q4 are thus prevented from being damaged by the high-frequency operation.

In this manner, the durability of such an apparatus for lighting a discharge lamp is greatly improved.

As described above, according to the present invention, the apparatus for lighting a discharge lamp comprises the inverter circuit 3 for causing the input power supply 2 to generate the voltage required for the discharge lamp, the rectifying smoothing circuit 4 for rectifying and smoothing the output of the inverter circuit 3, the feedback control circuit 8 for computing the power required for the discharge lamp 1 to control the feedback control circuit 8 in the feedback mode, the polarity switching circuit 9 for switching the polarity of the rectified and smoothed output to apply the output to the discharge lamp 1 with a low-frequency square wave, and the ignitor 11 for superposing a high-voltage pulse on the discharge lamp 1 when the discharge lamp 1 is started, the apparatus therefor including the overcurrent control circuit 14 for detecting an overcurrent flowing into the discharge lamp 1 so as to make the polarity switching circuit 9 perform the high-frequency chopper operation together with the low-frequency operation for only an interval during which the overcurrent flows. While the electrodes of the discharge lamp 1 are prevented from abrading, the apparatus simple in construction is allowed to limit the overcurrent flowing into the discharge lamp 1, whereby the discharge lamp 1 is prevented from abrading with the effect of prolonging the life of such a discharge lamp 1.

Further, the overcurrent control circuit 14 is provided with the dead-time generating circuit 19 for holding "off" all the switching elements Q1~Q4 of the polarity switching circuit 9 for a predetermined period of time while the overcurrent is set under controlled, so that the chopper operation frequency is drastically dropped down when the overcurrent is set under control. In other words, the stress applied to the switching elements Q1~Q4 is greatly reduced.

Furthermore, the capacitor C1, together with the discharge lamp 1 and the ignitor 11, forms the closed circuit 20, whereas the current-limiting inductance element 21 are connected to the polarity switching circuit 9 and the ignitor 11 in series outside the closed circuit 20, whereby the high-voltage pulse is caused to flow from the ignitor 11 into the closed circuit 20 to limit the inrush current which tends to flow into the capacitor C1 when the switching elements Q1~Q4 of the polarity switching circuit 9 are turned on and off. Each of the switching elements Q1~Q4 is thus prevented from being damaged.

Moreover, there is provided the overcurrent control stop circuit 22 for turning off all the switching elements Q1~Q4 of the polarity switching circuit 9 when the overcurrent control operation of the overcurrent control circuit 14 continues for a predetermined interval of time. Consequently, the switching elements Q1~Q4 of the polarity switching circuit 9 will not be damaged even if they continues Go perform the high-frequency operation for hours.

What is claimed is:

1. An apparatus for lighting a discharge lamp, comprising:
   an inverter circuit for causing an input power supply to generate the voltage required for a discharge lamp;
   a rectifying smoothing circuit for rectifying and smoothing the output of the invertor circuit;
   a feedback control circuit for computing the power required for the discharge lamp so as to control the feedback control circuit in the feedback mode;
   a polarity switching circuit for switching the polarity of the rectified and smoothed output to apply, during a low-frequency operation, the output to the discharge lamp in accordance with a low-frequency square wave;
   an ignitor for superposing a high-voltage pulse on the discharge lamp when the discharge lamp is started; and
   an overcurrent control circuit for detecting an overcurrent flowing into the discharge lamp to make the polarity switching circuit perform a high-frequency chopper operation for only an interval during which the overcurrent flows during the low-frequency operation.

2. An apparatus for lighting a discharge lamp, comprising:
   an invertor circuit for causing an input power supply to generate the voltage required for a discharge lamp;
   a rectifying smoothing circuit for rectifying and smoothing the output of the invertor circuit;
   a feedback control circuit for computing the power required for the discharge lamp so as to control the feedback control circuit in the feedback mode;
   a polarity switching circuit, including four switching elements in a form of a bridge circuit, for switching the polarity of the rectified and smoothed output to apply, during a low-frequency operation, the output to the discharge lamp in accordance with a low-frequency square wave;
   an ignitor for superposing a high-voltage pulse on the discharge lamp when the discharge lamp is started; and
   an overcurrent control circuit for detecting an overcurrent flowing into the discharge lamp, said overcurrent control circuit including a dead-time generating circuit for turning off all of said switching elements for a predetermined period of time when the overcurrent is detected as flowing into the discharge lamp, and for enabling said polarity switching circuit to resume the low-frequency operation after said predetermined period of time has elapsed.

3. An apparatus for lighting a discharge lamp as claimed in claim 1, further including a capacitor which, together with the discharge lamp and the ignitor, forms a closed circuit and a current-limiting inductance element connected to the polarity switching circuit and the ignitor in series outside the closed circuit.

4. An apparatus for lighting a discharge lamp as claimed in claim 2, further including a capacitor which, together with the discharge lamp and the ignitor, forms a closed circuit and a current-limiting inductance element connected to the polarity switching circuit and the ignitor in series outside the closed circuit.

5. An apparatus for lighting a discharge lamp as claimed in claim 1, further including an overcurrent control suspend circuit for turning off all of the switching elements of the polarity switching circuit when the overcurrent control operation of the overcurrent control circuit continues for a predetermined period of time.

6. An apparatus for lighting a discharge lamp as claimed in claim 2, further including an overcurrent control suspend circuit for turning off all of the switching elements of the polarity switching circuit when the overcurrent control operation of the overcurrent control circuit continues for a predetermined period of time.

7. An apparatus for lighting a discharge lamp as claimed in claim 3, further including an overcurrent control suspend circuit for turning off all of the switching elements of the polarity switching circuit when the overcurrent control operation of the overcurrent control circuit continues for a predetermined period of time.

8. An apparatus for lighting a discharge lamp as claimed in claim 4, further including an overcurrent control suspend circuit for turning off all of the switching elements of the polarity switching circuit when the overcurrent control operation of the overcurrent control circuit continues for a predetermined period of time.

* * * * *